US012742528B1

(12) United States Patent
Blair

(10) Patent No.: US 12,742,528 B1
(45) Date of Patent: Sep. 22, 2026

(54) LIGHT FIXTURE HOUSING FOR VERTICAL WALL

(71) Applicant: Michael Blair, Ladysmith (CA)

(72) Inventor: Michael Blair, Ladysmith (CA)

( * ) Notice: Subject to any disclaimer, the term of this patent is extended or adjusted under 35 U.S.C. 154(b) by 0 days.

(21) Appl. No.: 19/561,723

(22) Filed: Mar. 10, 2026

(51) Int. Cl.
*F21V 15/01* (2006.01)
*F21S 8/00* (2006.01)
*F21V 17/08* (2006.01)

(52) U.S. Cl.
CPC .............. *F21S 8/036* (2013.01); *F21V 15/01* (2013.01); *F21V 17/08* (2013.01)

(58) Field of Classification Search
CPC ........ F21V 15/01; F21V 17/08; F21V 21/116; F21V 23/06; F21V 17/12; F21V 3/02; F21V 15/015; F21W 2131/401; F21W 2131/10; F21S 8/00; F21S 8/08; F21S 8/033; H01R 13/523
See application file for complete search history.

(56) References Cited

U.S. PATENT DOCUMENTS 4,999,754 A * 3/1991 Gary ......................... F21V 1/00 362/237
7,108,394 B1 * 9/2006 Swarens ................. F21S 8/026 362/147

OTHER PUBLICATIONS

Rashimi (Led Wall Light for Home Decoration) https://www.mystore.in/en/product/5w-waterproof-led-wall-light-for-home-decoration-up-down-1-way-led-wall-lamp-or-ip65-outdoor-fancy-wall-lights-for-balcony-gate-elevation-garden-patio-or-decorative-wall-mount-light-pack-of-1?srsltid=AfmBOormxXIRu1oo (Year: 2025).*

* cited by examiner

*Primary Examiner* — Omar Rojas Cadima
(74) *Attorney, Agent, or Firm* — Orin Del Vecchio

(57) ABSTRACT

A light fixture housing that is configured to be mounted to a vertical wall wherein the light fixture housing is operable to have a recessed can light mounted therein. The light fixture includes a housing having a body portion wherein the body portion is contiguously formed with a rear flange member and extending outward therefrom. The rear flange member abuts a vertical wall and includes a plurality of apertures for fasteners to be journaled therethrough. The housing includes a tapered body portion comprised of a plurality of substantially planar faces that converge distal to the rear flange member. A lower wall member is contiguously formed with the body portion and faces downwards when the light fixture housing is mounted. The lower wall member includes a light receiving aperture configured to have a recessed can light mounted therein. The body portion has a hollow interior cavity.

8 Claims, 4 Drawing Sheets

LIGHT FIXTURE HOUSING FOR VERTICAL WALL

FIELD OF THE INVENTION

The present invention relates generally to lighting fixtures and mounting structures for lighting fixtures. More particularly, but not by way of limitation, the present invention relates to a housing configured to support recessed lighting fixtures such as recessed can lights and recessed LED downlights in non-traditional installation orientations and locations, including vertical wall installations and exterior wall applications.

BACKGROUND

Light fixtures are used in residential, commercial, and industrial environments to provide task lighting, ambient lighting, accent lighting, security lighting, and architectural illumination. Common fixture types include ceiling-mounted luminaires, pendant fixtures, chandeliers, track lighting systems, wall sconces, under-cabinet fixtures, strip lights, landscape and pathway fixtures, floodlights, and integrated architectural lighting elements such as cove lighting, step lights, and recessed luminaires. The selection of fixture type is often driven by desired aesthetics, illumination pattern, mounting surface constraints, environmental exposure, and ease of installation and maintenance. Among these categories, recessed lighting has achieved widespread adoption because it offers a clean appearance, minimizes protrusion into occupied space, and can be arranged in scalable patterns for uniform illumination. Traditional recessed fixtures typically include a cylindrical can or housing installed above a ceiling plane between joists, along with a trim assembly and a lamp or LED module. In many installations, recessed fixtures are selected for their ability to deliver downlighting with controlled beam angles and reduced glare while maintaining a low-profile architectural finish.

In recent years, LED technology has become predominant in recessed lighting. Recessed LED can lights and retrofit LED modules provide advantages such as improved energy efficiency, longer operational life, reduced heat generation relative to some legacy sources, compact form factors, and compatibility with modern dimming controls and color temperature options. As a result, recessed LED can lights are broadly utilized across new construction and renovation projects, including kitchens, hallways, offices, retail spaces, hotels, and other settings where downlighting is desired. Despite the broad use of recessed can lights, conventional recessed fixtures are typically designed and optimized for horizontal mounting surfaces such as ceilings. The can body, trim geometry, thermal design, and mounting hardware are often engineered around installation in a ceiling cavity, where the fixture axis is generally vertical and the light output is directed downward. Standard mounting approaches frequently rely on ceiling framing members, joists, or ceiling-specific brackets and clearances. In addition, many recessed fixtures are intended to be located within protected interior environments and are not configured to withstand outdoor exposure such as precipitation, wind-driven moisture, dust, or temperature extremes without additional measures.

When there is a desire to incorporate recessed-style lighting into exterior or architectural wall applications, installers and designers encounter practical limitations. Exterior vertical surfaces such as building façades, porch walls, columns, piers, retaining walls, and other wall structures may be desirable locations for directing light downward along a wall plane, washing a surface, illuminating a pathway, or providing security lighting. However, mounting a recessed can light to an exterior vertical wall is often problematic because typical can lights are not designed to be supported in a wall orientation, do not provide a mounting interface that aligns with wall construction practices, and may not fit within the limited depth available in many exterior wall assemblies. Even where a wall cavity exists, constraints associated with insulation, vapor barriers, sheathing, structural members, and exterior cladding can complicate placement and alignment of a traditional recessed can.

Further, directing light from a vertical surface typically requires the fixture to aim outward and downward relative to the wall, rather than producing illumination symmetric about a ceiling-mounted axis. Standard can lights generally emit light along an axis that assumes a ceiling plane; rotating the fixture for wall use may produce undesirable beam orientation, glare, water intrusion risks, and mounting instability. Exterior use can also raise additional concerns regarding sealing against moisture, maintaining a reliable mounting plane, achieving consistent trim alignment, and accommodating wiring practices common to exterior wall construction. These limitations can lead to custom field modifications, improvised brackets, or substitution with surface-mounted fixtures that may not provide the desired recessed aesthetic or beam control.

Accordingly, there remains a need for improved structures that enable the use of recessed can lights, including recessed LED can lights, on vertical wall surfaces particularly exterior vertical walls while maintaining a secure mounting interface and providing a controlled, downwardly directed illumination pattern. An opportunity exists to develop a purpose-built housing configured to receive a recessed can light therein and further configured for attachment to a vertical wall, such that the housing supports the can light in a stable and repeatable orientation suitable for vertical installation. Such a housing can expand the applicability of widely available recessed can lighting products to exterior and wall-mounted architectural lighting designs, reduce installation complexity, and provide more consistent performance and appearance than improvised adaptations.

SUMMARY OF THE INVENTION

It is the object of the present invention to provide a light fixture housing configured to be secured to a vertical wall wherein the present invention includes a body manufactured from a durable material such as but not limited to plastic.

Another object of the present invention is to provide a housing providing a technique to mount a recessed can light on a vertical wall wherein the body includes a flange portion at the rear end thereof having a plurality of apertures for securing the body to a vertical wall.

A further object of the present invention is to provide a light fixture housing configured to be secured to a vertical wall wherein the present invention further includes a trim ring member releasably secured over the flange portion of the body.

Yet a further object of the present invention is to provide a housing providing a technique to mount a recessed can light on a vertical wall wherein the body includes opposing sidewalls and a top wall integrally formed to create an interior volume.

Still another object of the present invention is to provide a light fixture housing configured to be secured to a vertical wall wherein the housing includes a bottom wall member having an aperture for a recessed can light.

An additional object of the present invention is to provide a housing providing a technique to mount a recessed can light on a vertical wall wherein the interior volume is configured to house a portion of the can light and the LED driver module.

Yet a further object of the present invention is to provide a light fixture housing configured to be secured to a vertical wall wherein alternate embodiments of the housing include various quantities of walls and shapes of the body To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
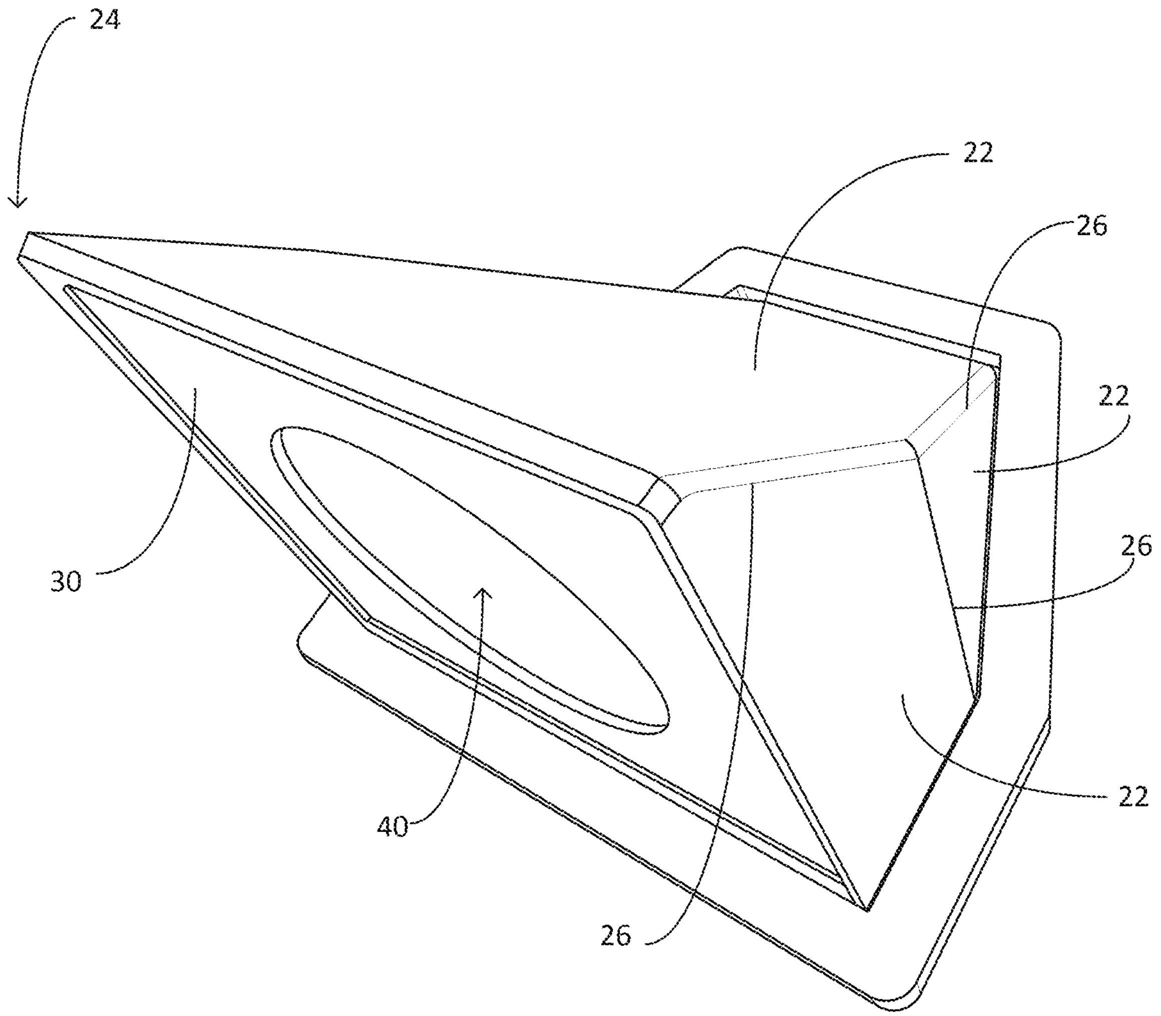
FIG. 1 is a bottom perspective view of the present invention.
Figure 2:
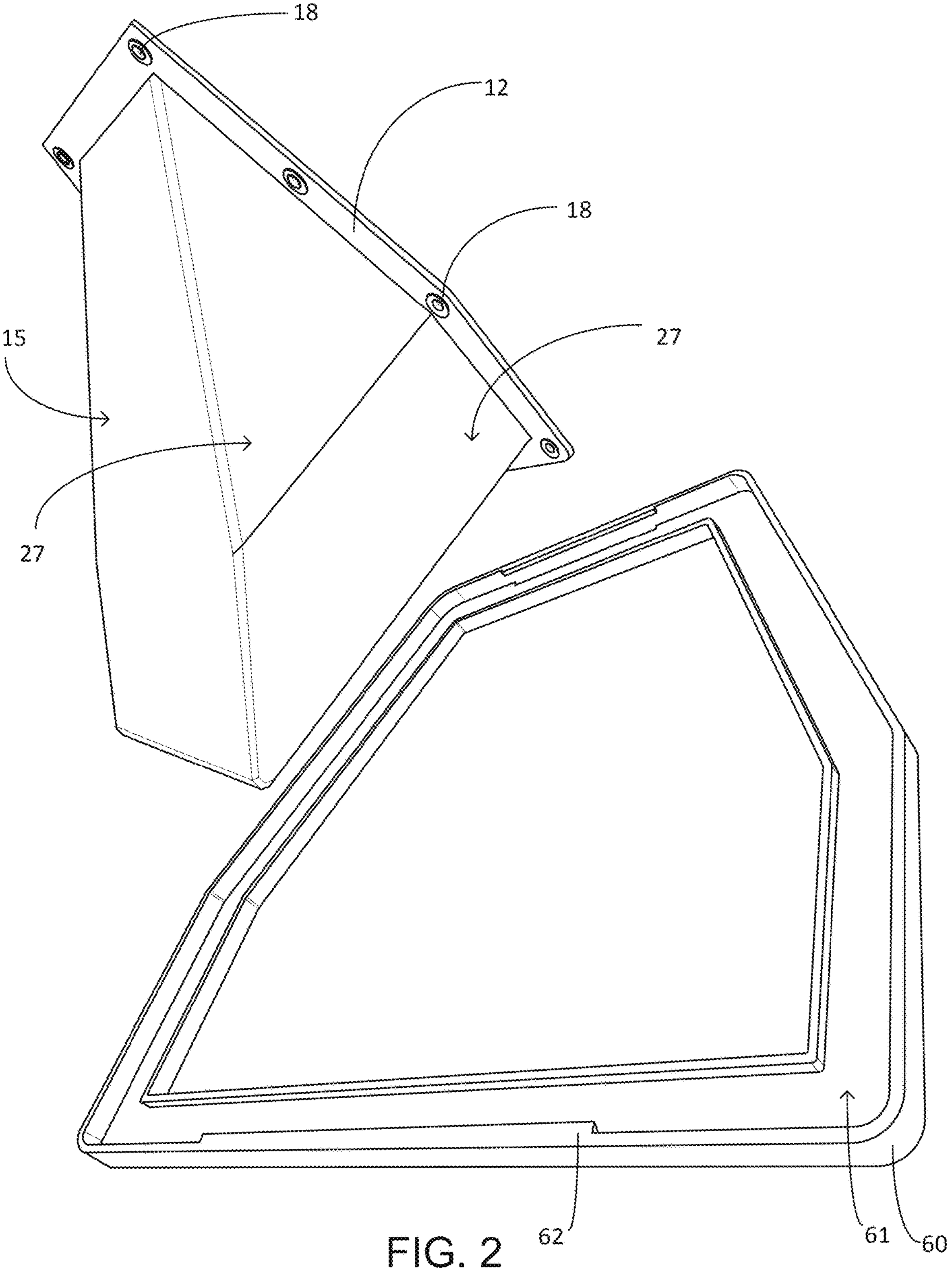
FIG. 2 is a detailed rear view of the trim ring member and rear view of the body of the present invention.
Figure 3:
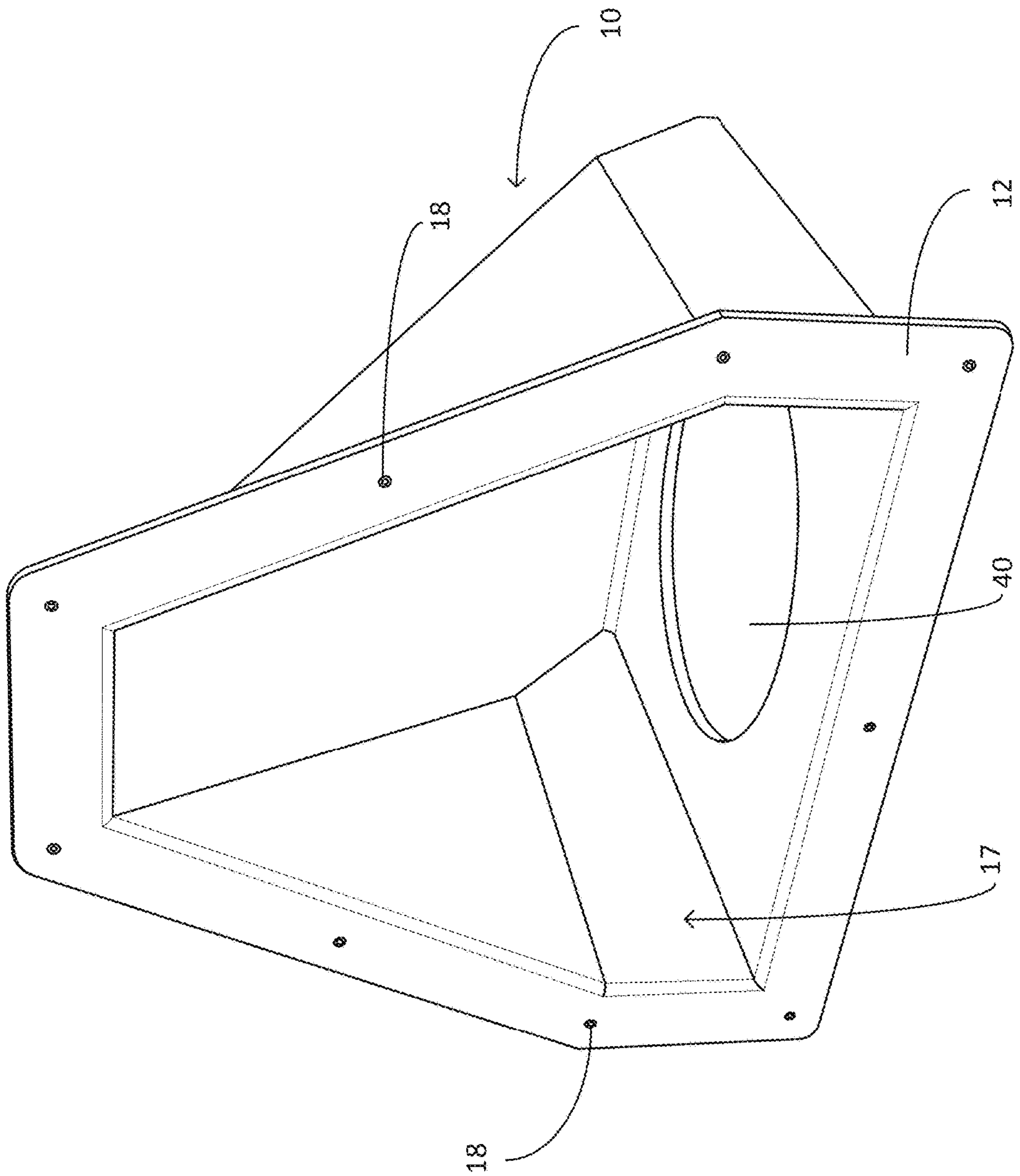
FIG. 3 is a perspective rear view of the body of the present invention.
Figure 4:
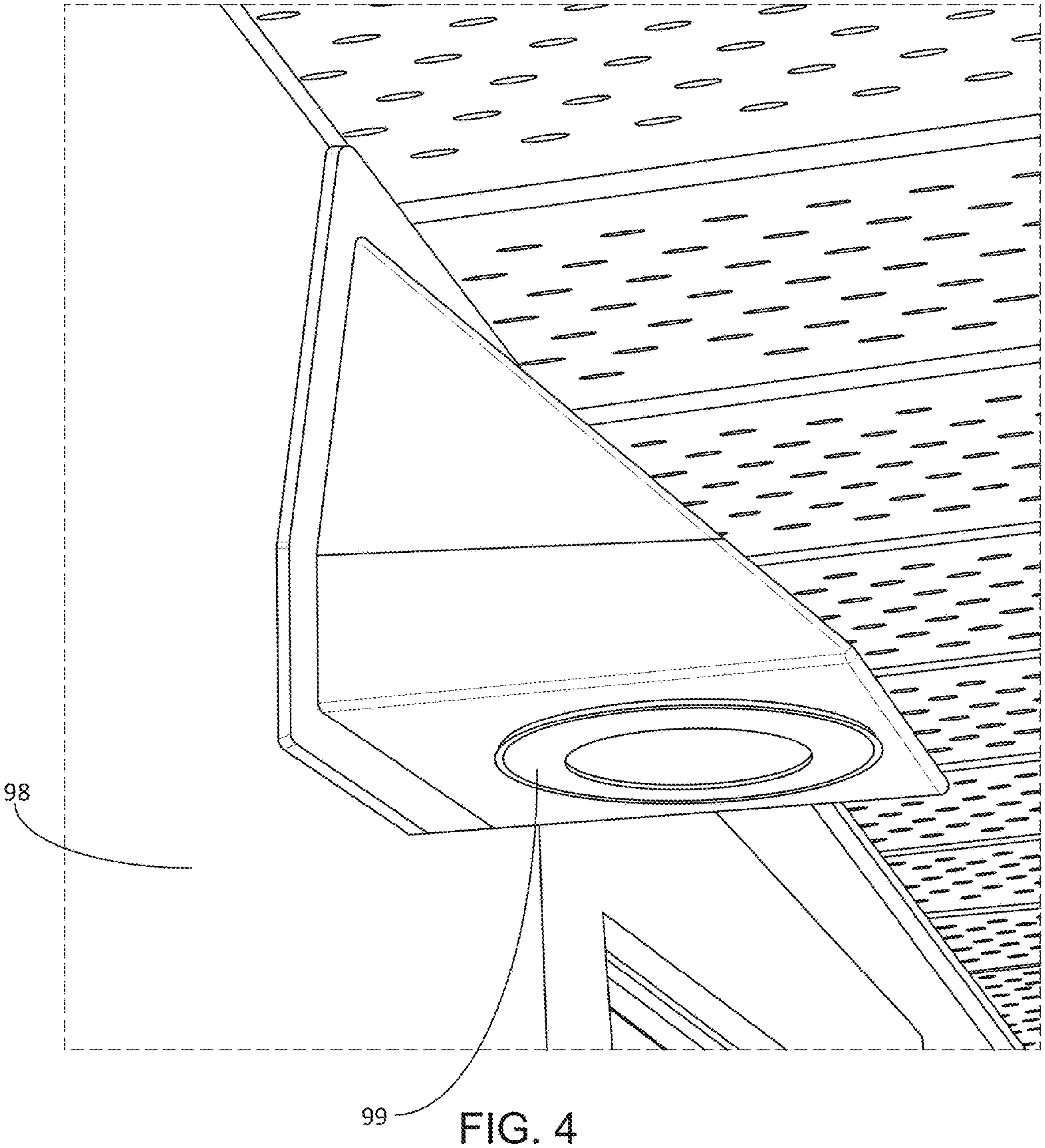
FIG. 4 is a side perspective view of the present invention in an exemplary installation.

Referring now to the drawings submitted herewith, wherein various elements depicted therein are not necessarily drawn to scale and wherein through the views and figures like elements are referenced with identical reference numerals, there is illustrated a light fixture housing 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms “a”, “an” and “the” include the plural reference unless the context clearly dictates otherwise. Thus, for example, a reference to “an element” is a reference to one or more elements and includes equivalents thereof known to those skilled in the art. All conjunctions used are to be understood in the most inclusive sense possible. Thus, the word “or” should be understood as having the definition of a logical “or” rather than that of a logical “exclusive or” unless the context clearly necessitates otherwise. Structures described herein are to be understood also to refer to functional equivalents of such structures. Language that may be construed to express approximation should be so understood unless the context clearly dictates otherwise.

References to “one embodiment”, “an embodiment”, “exemplary embodiments”, and the like may indicate that the embodiment(s) of the invention so described may include a particular feature, structure or characteristic, but not every embodiment necessarily includes the particular feature, structure or characteristic.

Referring in particular to the Figures submitted herewith, the light fixture housing 100 is configured to support a recessed can light 99 on a vertical surface such as a wall. The housing 10 includes a rear flange member 12 and a forwardly projecting tapered body portion 15 that defines a hollow interior cavity 17 sized to receive at least a portion of a recessed can light fixture. It should be understood within the scope of the present invention that the tapered body portion 15 could be provided in alternate sizes so as to accommodate recessed can lights of different diameters. The rear flange member 12 is generally planar and configured to abut a vertical structural surface. In the illustrated embodiment, the rear flange member 12 is substantially rectangular when viewed from the rear and forms a peripheral outer edge forming a continuous border. The rear flange member 12 extends radially to provides a mounting surface for substantially flush engagement against a wall surface 98. The rear flange member 12 includes a plurality of apertures 18 for fasteners to be journaled therethrough to secure the housing 10 to wall surface 98.

Projecting outwardly from the rear flange member 12 in a direction generally perpendicular to the plane of the rear flange member 12 is the body portion 15 having a tapered geometry. The tapered body portion 15 narrows from a larger cross-sectional area adjacent the mounting plate to a smaller cross-sectional area at a forward distal end. In the illustrated embodiment, the exterior of the tapered body portion 15 comprises a plurality of substantially planar wall members 22 that converge toward the distal end 24, forming angular transitions along linear edges 26. The body portion 15 presents a faceted configuration resembling a truncated pyramidal or frustoconical structure rather than a continuously curved conical surface. It is contemplated within the scope of the present invention that the body portion 15 could be formed from various alternate quantities of wall members in order to provide a plurality of different shapes for the body portion 15.

Formed in the lower wall member 30 of the body portion 15 is a light-receiving aperture 40 configured to receive a recessed can light fixture 99. The light-receiving aperture 40 is substantially annular and extends through the wall thickness of the lower wall member 30 into the hollow interior cavity 17. When the rear flange member 12 is secured to vertical wall surface 98, the light-receiving aperture 40 is positioned on the downwardly facing lower wall member 30. The annular light-receiving aperture 40 defines a central axis that is oriented at a non-perpendicular angle relative to the plane of the rear flange member 12. This angular relationship allows the recessed can light 99 to be mounted onto a vertical wall 98 while directing emitted light downwardly and outwardly at a selected angle relative to the wall surface.

The body portion 15 defines the internal cavity 17 extending between the rear flange member 12 and the distal end 24. The internal cavity 17 is dimensioned to receive at least a portion of the recessed can light 99 which is operably coupled with the annular light-receiving aperture 40. It is contemplated within the scope of the present invention that the interior cavity 17 may include internal structural features, such as shoulders, ledges, ribs, or other retention elements, to support, align, or secure the recessed can light 99 within the housing 10. Trim ring member 60 is configured to be releasably secured over the rear flange portion 12 so as to provide coverage thereof concealing the apertures 18 and fasteners therein. The trim ring member 60 includes a channel portion 61 and tab members 62 integrally formed facilitating the ability for the trim ring member 60 to be releasably secured over the rear flange member 12.

The exterior surfaces 27 of the tapered body portion 15 may include slight chamfering at edges where planar faces intersect. The housing 10 may be formed as a unitary structure or as multiple components rigidly secured together utilizing suitable durable techniques. By way of example but not limitation housing 10 could be formed utilizing manufacturing processes that include additive manufacturing, molding, casting, machining, or fabrication techniques. The housing 10 may be formed from polymeric materials, composite materials, or metals capable of supporting the recessed can light 99 and withstanding heat generated by the light source during operation.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A light fixture housing configured to facilitate mounting of a recessed can light onto a surface of a vertical wall wherein the light fixture housing comprises:

a housing, said housing having a body portion, said body portion having a rear flange member, said rear flange member configured to abut the vertical wall being parallel therewith, said body portion further having at least one wall member, said at least one wall member extending outward from said rear flange member away from the vertical wall, said at least one wall member forming a hollow interior cavity, said body portion having a lower wall member, said lower wall member facing downward, said lower wall member having an aperture configured to receive the recessed can light therein.

2. The light fixture housing configured to facilitate mounting of a recessed can light onto a surface of a vertical wall as recited in claim 1, wherein said rear flange member includes a plurality of apertures, said plurality of apertures operable to have fasteners journaled therethrough to secure the housing to the vertical wall.

3. The light fixture housing configured to facilitate mounting of a recessed can light onto a surface of a vertical wall as recited in claim 2, and further including a trim ring member, said trim ring member having a channel on a rear side thereof, said trim ring member configured to be releasably secured over the rear flange member.

4. The light fixture housing configured to facilitate mounting of a recessed can light onto a surface of a vertical wall as recited in claim 3, wherein said trim ring member further includes protrusions formed on the rear side thereof, said protrusions configured to operably coupled with an outer edge of said rear flange member.

5. A light fixture housing configured to facilitate mounting of a recessed can light onto a surface of a vertical wall wherein the light fixture housing comprises:

a housing, said housing having a body portion, said body portion being tapered in form having a plurality of substantially planar wall members contiguously formed that converge toward a distal end forming angular transitions along linear edges of said body portion, said body portion having a faceted configuration being frustoconical in shape, said body portion having a rear flange member contiguously formed therewith, said rear flange member configured to abut the vertical wall being parallel therewith, said rear flange member forming a peripheral outer edge, said rear flange member extending radially around a rear end of said body portion to provides a mounting surface for flush engagement against the vertical wall, said body portion having a hollow interior cavity, said body portion having a lower wall member contiguously formed with said planar wall members, said lower wall member facing downward, said lower wall member having a light-receiving aperture formed therein; and wherein said light-receiving aperture is configured to have the recessed can light mounted therein.

6. The light fixture housing configured to facilitate mounting of a recessed can light onto a surface of a vertical wall as recited in claim 5, wherein said rear flange member includes a plurality of apertures, said plurality of apertures operable to have fasteners journaled therethrough to secure the housing to the vertical wall.

7. The light fixture housing configured to facilitate mounting of a recessed can light onto a surface of a vertical wall as recited in claim 6, and further including a trim ring member, said trim ring member having a channel on a rear side thereof, said trim ring member configured to be releasably secured over the rear flange member, wherein said trim ring member further includes protrusions formed on the rear side thereof, said protrusions configured to operably coupled with an outer edge of said rear flange member.

8. The light fixture housing configured to facilitate mounting of a recessed can light onto a surface of a vertical wall as recited in claim 7, wherein the light-receiving aperture defines a central axis that is oriented at a non-perpendicular angle relative to a plane of the rear flange member, wherein this angular relationship allows a recessed can light to be mounted onto a vertical wall in the light fixture housing an direct emitted light in a downward direction.

* * * * *